July 13, 1965 C. D. BRONS ETAL 3,194,937

PORTABLE ELECTRIC WELDER

Filed May 26, 1964 3 Sheets-Sheet 1

Inventors
Charles D. Brons
Walter W. Gaither
Louie J. Rousseau
Attorney

PORTABLE ELECTRIC WELDER
Filed May 26, 1964 3 Sheets-Sheet 2
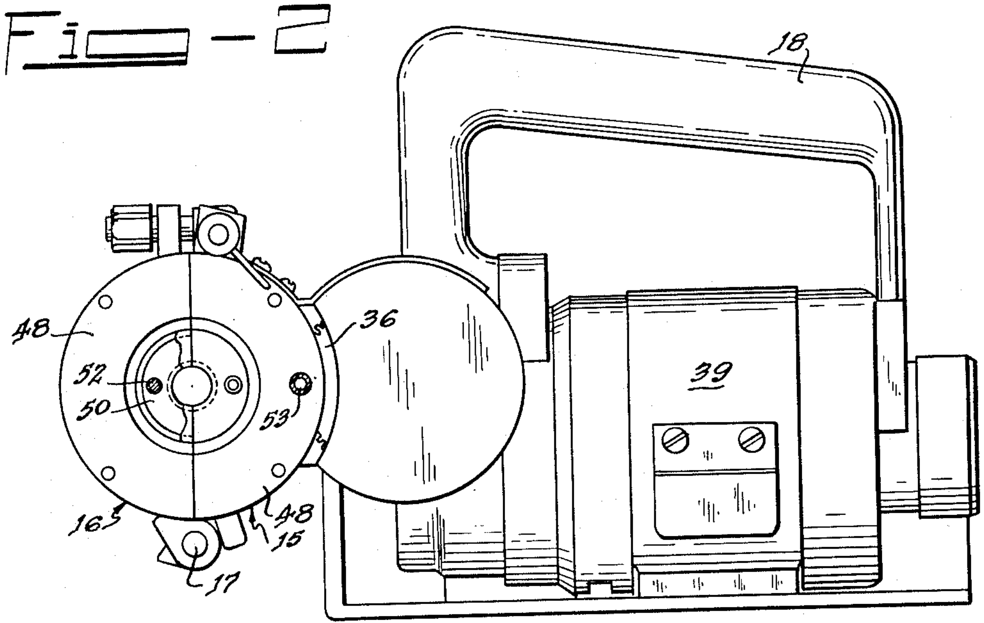
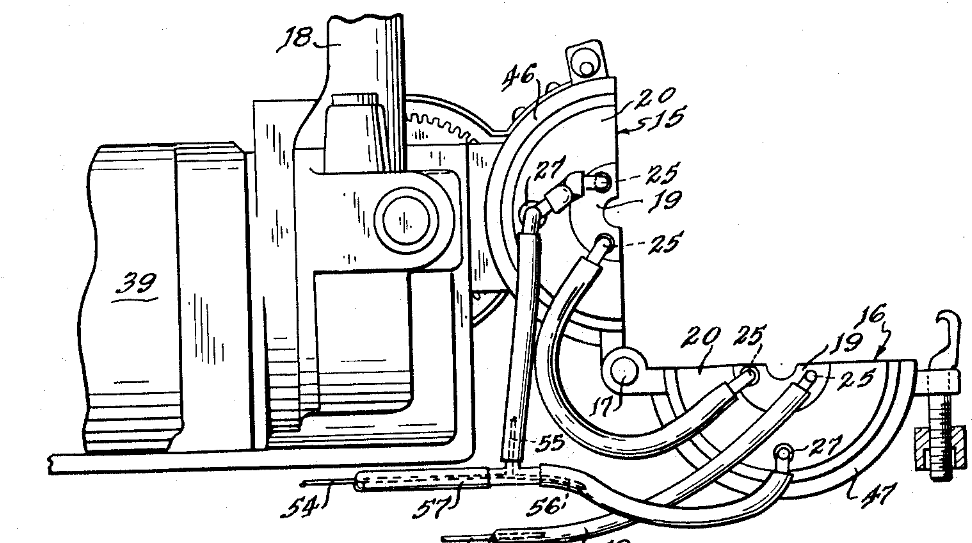
Inventors
Charles D. Brons
Walter W. Gaither
Louie J. Rousseau
Roland A. Anderson
Attorney July 13, 1965 C. D. BRONS ETAL 3,194,937

PORTABLE ELECTRIC WELDER

Filed May 26, 1964 3 Sheets-Sheet 3

Inventors
Charles D. Brons
Walter W. Gaither
Louie J. Rousseau

Roland A. Anderson
Attorney

United States Patent Office 3,194,937

Patented July 13, 1965

3,194,937

PORTABLE ELECTRIC WELDER

Charles D. Brons, Richland, and Walter W. Gaither and Louie J. Rousseau, Kennewick, Wash., assignors to The United States of America as represented by the United States Atomic Energy Commission Filed May 26, 1964, Ser. No. 370,385

3 Claims. (Cl. 219—60)

This invention relates to a portable, remote-controlled tube welder. In more detail, the invention relates to a portable welder suitable for welding thin-wall tubing to a coupler which connects separate sections of tubing.

In certain applications it is necessary to connect thin-wall tubing by welding. To accomplish this a coupler is employed and the tubes are joined to the coupler by a fillet or "socket" weld. While this can be accomplished with conventional equipment and techniques the time required for making thousands of such welds by hand is so great as to considerably extend the time required for construction of a facility requiring many such connections. It is thus necessary to develop an automatic welder for this purpose. Basic requirements are:

(1) The welder must be light in weight and hand-portable.

(2) The diameter of the welding head must be small to permit welding in difficult positions and limited space.

(3) The welder must be capable of being placed on and removed from long runs of tubing.

(4) Welding must be accomplished in an inert-gas atmosphere to prevent damage to the metal through oxidation.

(5) The welder must include provision for very precise control of process variables such as welding currents, travel speeds, etc.

(6) The welder must include means for cooling the welding head, since the welder is to be used for volume welding.

It is accordingly the object of the present invention to develop a portable welder for welding thin-wall tubing to couplers joining separate sections of the tubing.

Other objects will appear from the disclosure.

In the drawings:

FIG. 2 is a plan view of the welder with pivoted parts swung shut;

FIG. 3 is a bottom view of the welder with pivoted parts swung open;

Figure 1:
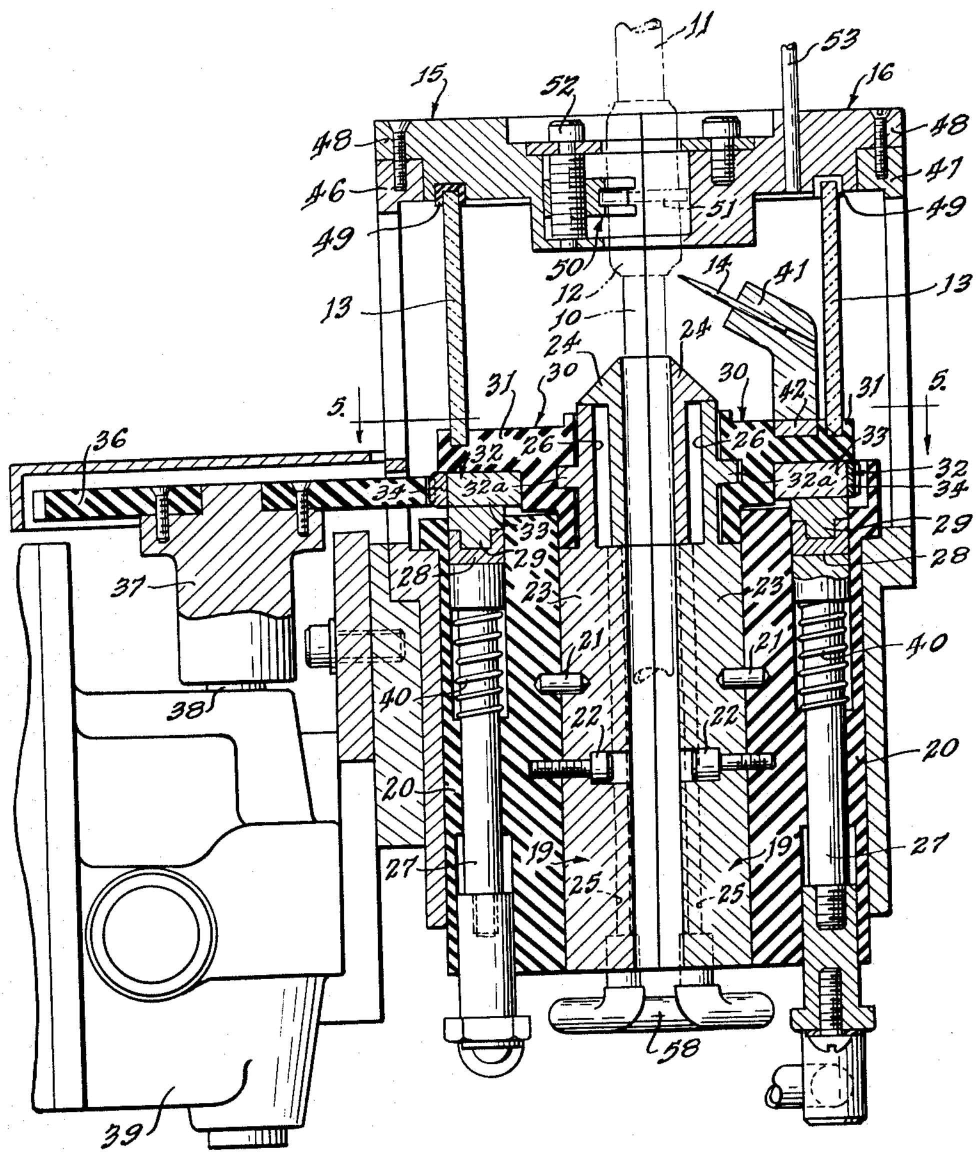
FIG. 1 is a longitudinal sectional view of the welder of the present invention.

As shown in FIG. 1, the welder of the present invention is adapted to hold and contain for welding an assembly comprising tubes 10 and 11 and a coupling 12. The coupling 12 is welded to the tube 10 within a chamber formed by shell parts 13 Pyrex glass by a welding electrode 14 of tungsten which rotates about the tube 10 and coupling 12 during the welding operation.

As shown in FIG. 3, the welder is formed in mating or complementary units 15 and 16, which are hinged or pivotally connected to one another as at 17 so as to swing apart and admit the assembled tubes and coupling to be welded. The assembly of tubes 10 and 11 and coupling 12 are vertically supported through the lower end of the tube 10 which rests on the floor and are kept vertical by the welder which is manipulated by the operator through a handle 18. The handle may be seen in FIG. 2.

Figure 5:
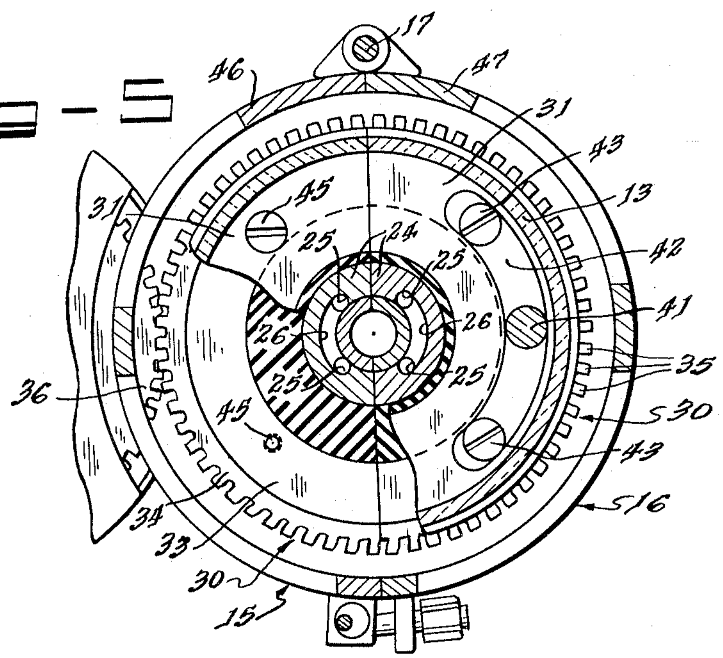
FIG. 5 is a sectional view taken on the line 5—5 of FIG. 1.

As shown in FIGS. 1 and 3, each of the units 15 and 16 comprises an inner conducting member 19 and outer insulating member 20 of nylon partially surrounding member 19 and being positioned and secured with respect thereto by a pin 21 and a screw 22. The conducting members 19 are grooved to receive and hold the tube 10. Each member 19 is formed of a brass body 23 and a copper insert 24 for clamping the tube 10 adjacent the coupling 12. As shown in FIGS. 1 and 5, each member 19 has two longitudinal coolant passages 25 in the brass body 23 and an arcuate coolant space 26 formed between the body 23 and insert 24 so as to connect the passages 25 to one another.

As shown in FIG. 1, each of the insulating members 20 carries a brass conductor rod 27 having its upper end 28 arcuate and widened out into and out of the plane of the drawing. The end 28 on each rod 27 is of copper and carries an insert in the form of a carbon brush 29, which is similarly arcuate and widened out.

As shown in FIGS. 1 and 5, the welding electrode 14 is rotated about the tubes 10 and 11 and coupling 12 by a rotatable annular unit formed of two complementary semicircular halves 30 each comprising a nonconducting semicircular section 31 of Bakelite or Teflon and a conducting semicircular section 32. Each nonconducting section 31 has grooves in which the shell parts and a rib *32a* on which each of the conducting parts 19 ride. Each conducting section 32 is mounted on one of the nonconducting sections 31 so as to be insulated from the conducting member 19 and comprises a radially inner portion 33 of copper having sliding contact with the brushes 29 and radially outer or rim portion 34 of brass brazed to the inner portion 33. The outer portion 34 has teeth 35 meshing with a gear 36 secured to a hub 37 fixed to a countershaft 38 driven through gears (not shown) by a motor 39.

Figure 4:
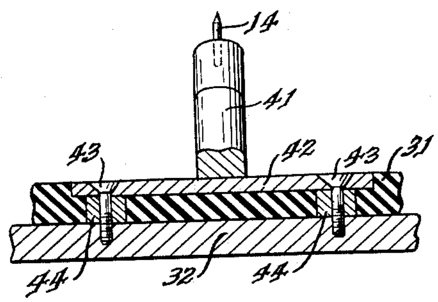
FIG. 4 is a fragmentary elevation showing the mounting of the welding electrode.

As shown in FIG. 1, springs 40 act between the conductors 27 and shoulders in the insulating members 20 to keep the brushes 29 in contact with the copper portions 33. The welding electrode is fixed in a copper holder 41, which is brazed to a copper base 42. As shown in FIGS. 1, 4, and 5, the base 42 is arcuate and rests in a groove formed in one of the two nonconducting sections 31 and is secured to the associated conducting section 32 by screws 43 which go through the base 42 and are threaded into nuts 44 and the section 32. The nuts 44 are brazed to the section 32 and rest in recesses formed in the section 31. On the other half 30, to which the electrode 14 is not attached, the section 31 and 32 are attached to one another by screws 45 which go through section 31 and are threaded into section 32.

The parts of each of the units 15 and 16 are held together by casing sections 46 and 47, 46 for unit 15 and 47 for unit 16. Each of the sections 46 and 47 has an end member 48 which receives the associated shell section 13 in a U-shaped nylon insert 49. The height of the coupling 12 with respect to the welding electrode 14 is controlled by an adjustable grooved part 50, which engages a rib 51 on the coupling 12. The part 50 has a threaded connection with a screw 52 carried by one end member 48. Angular movement of the screw 52 adjusts the height of the grooved part 50. A line 53 connected to one end member 48 supplies an inert gas as a welding atmosphere to the space enclosed by the shell parts 13.

As shown in FIG. 3, an electric conductor 54 is split into branches 55 and 56, branch 55 being connected to the conductor 27 in the insulating member 20 of the unit 15, and branch 56 to the conductor 27 in the insulating member 20 of the unit 16. The conductor 54 and its branch 55 are in an inlet conduit 57 for coolant, which extends to the connection of the branch 55 with the one conductor 27 and therebeyond to one passage 25 in the conducting member 19 of the unit 15. An intermediate conduit 58 connects the other passage 25 with a passage 25 in the conducting member of the unit 16. The other passage 25 is connected with an outlet conduit 59 for coolant, which houses an electric conductor 60 connected with the conducting member 19 of the unit 16. The coolant, which may be water, enters the conducting member 19 of the unit 15 from the inlet conduit 57, passes through one passage 25 to the space 26 in the said conducting member 19, returns through the other passage 25, passes from the conducting member 19 of the unit 15 to that of the unit 16 through the intermediate conduit, passes through one passage 25 of unit 16 to the space 26, returns by the other passage 25, and exits through the outlet conduit 59.

It is contemplated that the tubes 10 and 11 and coupling 12 will be small in diameter and will be formed of Inconel or stainless steel. The tubes may be ¼" to ½" in outside diameter and have a wall thickness of about .049". In this event, direct current will be used for the arc between the welding electrode 14 and the coupling 12, so that a fusing occurs between the coupling and the tube 10. The power lead is the conductor 54, and the conductor 60 is grounded. The welding arc is established between the welding electrode and the parts to be welded by a high-frequency current.

Significant features of the present invention are that nonrotatable semicircular parts are pivoted toward one another to enclose the parts to be welded in a welding atmosphere and that a welding electrode is supported and moved in a complete revolution in the welding atmosphere about the parts to be welded by rotatable semicircular parts that supply electricity to the welding electrode and are insulated from the nonrotatable semicircular parts in which they are mounted.

It is to be understood that the welding operation of the present invention may be carried out automatically or semiautomatically, but this is not disclosed here, since per se it forms no part of the present invention. Inert gas is to flow from the line 53 into the welding chamber formed by the shell sections 13 for some time before the welding operation begins. Similarly, coolant should flow for some time in the conducting members before the start of the welding operation. The high-frequency current is shut off after the welding arc is initiated. The complementary halves 30 and the welding electrode may be rotated for about 45° beyond a more complete revolution in order that the welding current may be reduced gradually after a complete revolution to assure a weld of good quality. In this event, after interruption of the welding arc, the sections 30 will have to be backed up 45° to be even with the units 15 and 16.

It is also understood that the invention is not to be limited by the details given herein but that it may be modified within the scope of the appended claims.

The embodiments of the invention in which an exclusive property or privilege is claimed are defined as follows:

1. A welder for embracing and welding two tubes and a coupling, said welder comprising two complementary conducting members embracing one of the tubes to be welded, two complementary insulating members cooperating to embrace the conducting members, two complementary shell parts extending axially beyond the conducting members and being radially outward thereof and cooperating to enclose a welding space, means for holding one conducting member, one insulating member, and one shell part fixed to one another in a unit, means for holding the other conducting member, the other insulating member, and the other shell part fixed to one another in a second unit, means for pivotally connecting the units to one another to permit insertion of the tubes and coupling, an annular unit rotatable with respect to the conducting members, insulating members, and shell parts when brought together to embrace the tubes and coupling to be welded, each annular unit being formed of complementary halves each comprising a nonconducting section engaging the shell parts and conducting members so as to ride thereon during rotation of the annular unit, a conducting section mounted on the nonconducting section so as to be insulated from the conducting members and to face the insulating members at one end, and gear teeth provided on the conducting sections for rotating the annular unit, the annular unit further comprising a welding electrode positioned within the shell parts and mounted on one of the complementary halves in conducting relationship with the conducting section thereof, the welding electrode rotating about the tubes and coupling during rotation of the annular unit, and brushes mounted in the insulating members so as to have sliding contact with the conducting section.

2. The welder specified in claim 1 and further comprising a first electric lead divided in two branches, one branch going to one of the insulating members and being connected with the brush mounted therein, the other branch going to the other insulating member and being connected with the brush mounted therein, an inlet conduit for coolant containing the first electric lead and extending to one of the insulating members and thence to one of the conducting members, a second electric lead connected with the other of the conducting members, an intermediate conduit foor coolant between the conducting members, and an outlet conduit for coolant leading from the said other conducting member and containing the second electric lead.

3. The welder specified in claim 1, each of the conducting sections of the annular unit being formed of a radially inner copper portion and a radially outer brass portion, the copper portion having sliding contact with the brushes mounted in the insulating members, the brass portion having the gear teeth rotating the annular unit.

References Cited by the Examiner

UNITED STATES PATENTS

| 3,035,147 | 5/62 | Latter | 219—60.1 |
|---|---|---|---|
| 3,042,787 | 7/62 | Kotecki | 219—60.1 |

RICHARD M. WOOD, *Primary Examiner.*